UNITED STATES PATENT OFFICE.

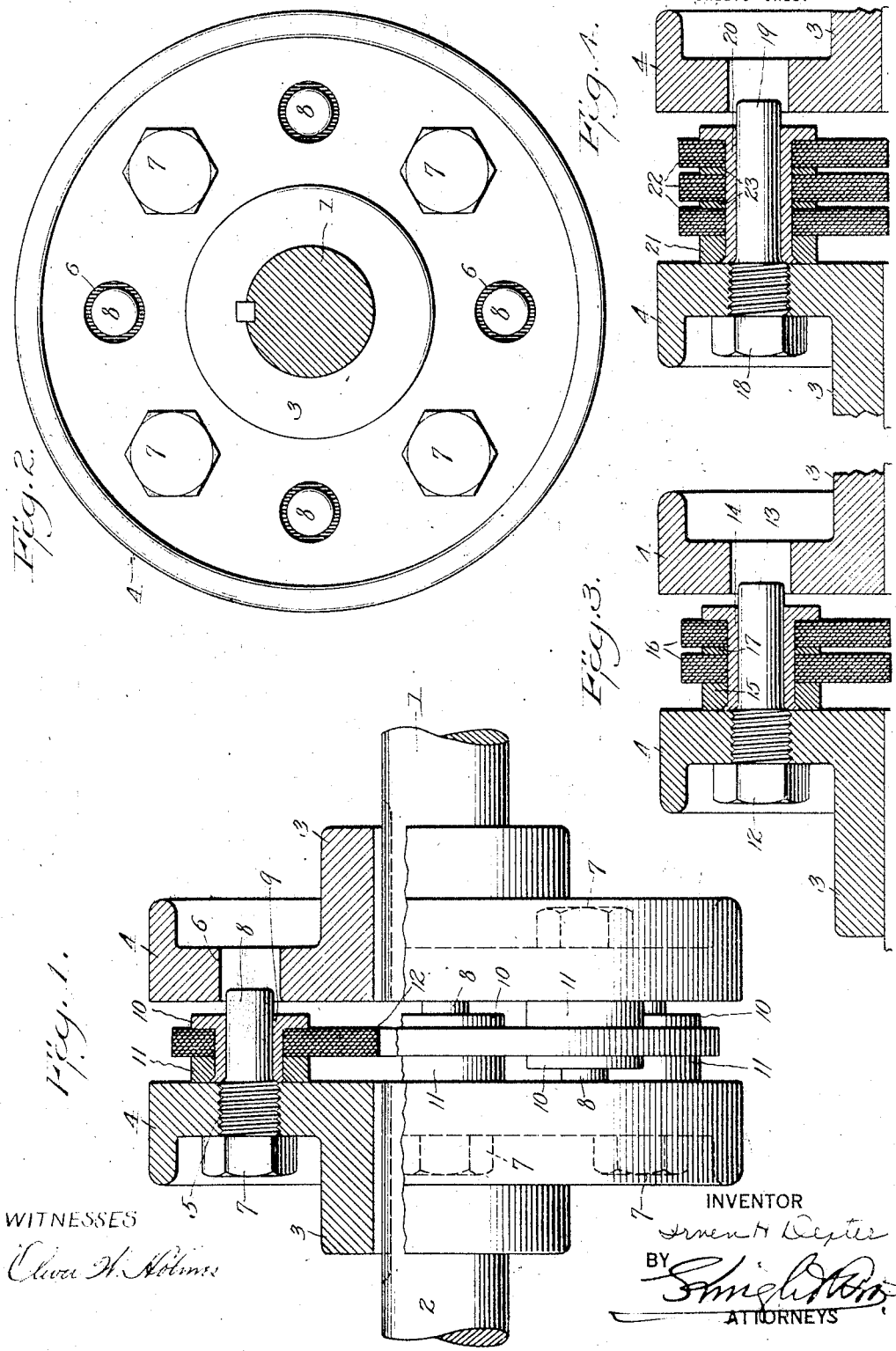

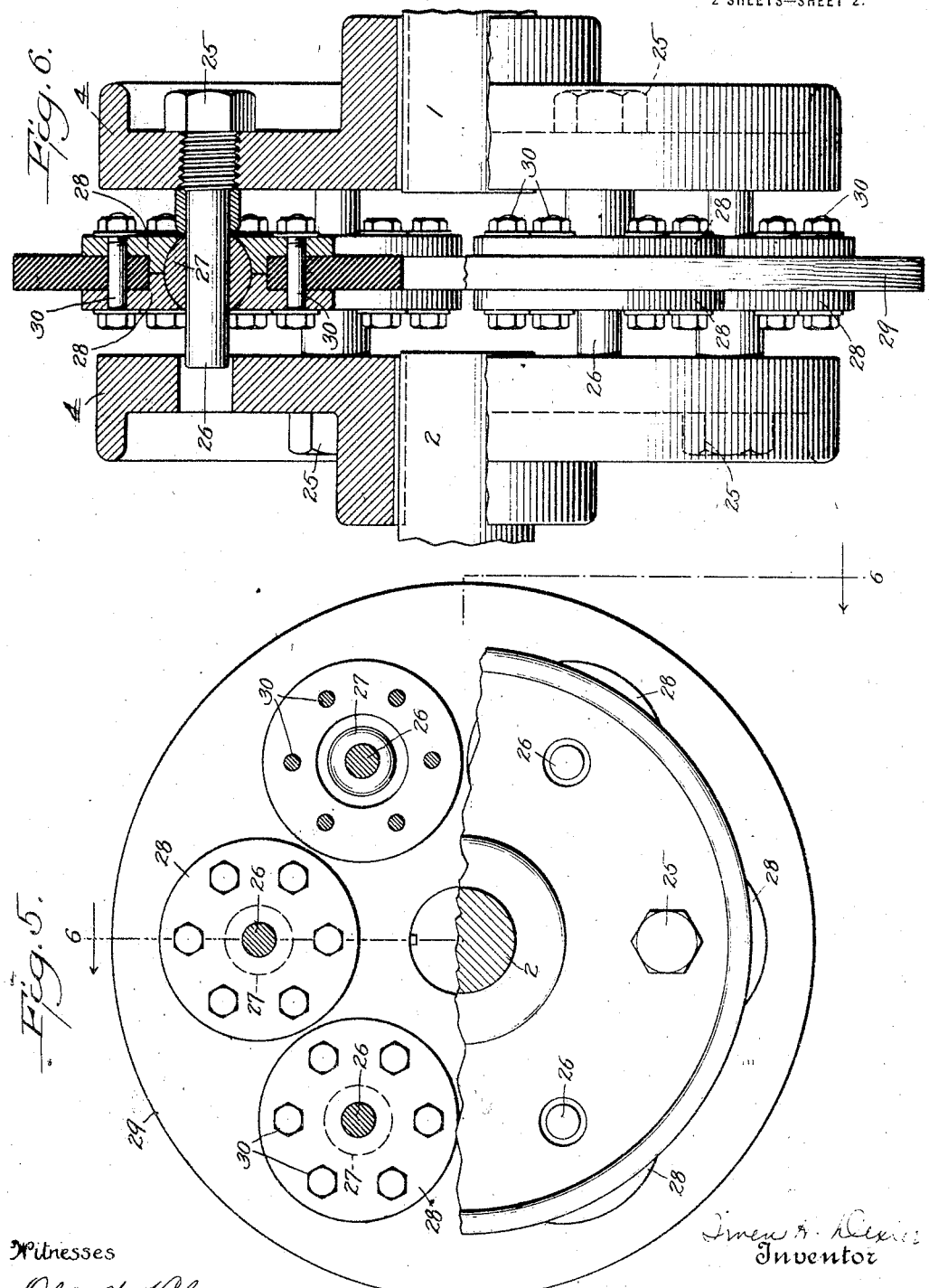

IRVEN H. DEXTER, OF PEARL RIVER, NEW YORK, ASSIGNOR TO I. H. DEXTER CO., INC., OF NEW YORK, N. Y., A CORPORATION OF NEW YORK.

FLEXIBLE COUPLING.

1,387,532.     Specification of Letters Patent.     Patented Aug. 16, 1921.

Application filed July 8, 1919. Serial No. 309,364.

*To all whom it may concern:*

Be it known that I, IRVEN H. DEXTER, a citizen of the United States, residing at Pearl River, in the county of Rockland and State of New York, have invented certain new and useful Improvements in Flexible Couplings, of which the following is a specification.

This invention relates to flexible couplings in which flexible disks are employed as power transmitting elements between the driving and driven members, it being customary to rigidly clamp a disk at alternate points to the coupling flanges of said driving and driven members. In such a construction, the flexibility is due almost entirely to the lateral bending of the disk, although there may be some slight circumferential stretching. In this common form of disk coupling, it sometimes happens that the material of the disk stretches in excess of its strength by reason of the coupling being strained when the coupling is flexed to too great an extent. The primary object of this invention is to remove as far as possible these deleterious effects by permitting lateral play between disk and coupling flanges while maintaining the positive coupling between the driving and driven members. It is therefore contemplated to permit said flexible disk to assume automatically, a proper neutral plane of operation as between the flanges of the coupling members. Other and further objects of invention will appear in the specification and be pointed out in the appended claims, reference being had to the accompanying drawings which exemplify my invention in several embodiments.

In the drawings:

Figure 1 is a combined side elevation and section of one embodiment of my invention;

Fig. 2 is an elevation of the same at right angles to Fig. 1;

Fig. 3 is a fragmentary section of a modified construction, parts being shown in elevation;

Fig. 4 is a similar fragmentary section of another embodiment, parts being shown in elevation;

Fig. 5 is a side elevation of another embodiment parts being broken away and parts shown in section;

Fig. 6 is a side elevation and section on the line 6—6, Fig. 5.

Referring more particularly to the drawings and first to the embodiment of my invention shown in Figs. 1 and 2, the adjacently disposed ends of shafts 1 and 2 are coupled by a flexible coupling of the so called disk type. The main coupling members are substantially similar in construction, each including a hub portion 3 and a flange portion 4. The flange 4 of each of said main coupling members is provided with a circular series of threaded sockets 5 and clearance holes 6 which are alternately arranged with respect to each other. Threaded into each of said sockets are studs 7 provided with laterally projecting reduced ends 8. The threaded sockets 5 in each coupling member are arranged opposite to the clearance holes 6 in the other coupling member. Slidable axially on each of the reduced end portions 8 of the studs 7, is a bushing or thimble 9 with a flange 10 at its outer end. Mounted on each bushing or thimble adjacent to the flange 4 is a washer 11. Interposed between the flanges 4 of the coupling members is a flexible disk 12 which is provided with a circular series of sockets or openings which fit over the bushings or thimbles 9. By means of this construction, said flexible disk 12 is slidably connected with both coupling members as far as axial adjustment is concerned but has little or no circular adjustment with each of said coupling members. From an inspection of Fig. 3, it will be seen that my improved construction provides a ready means for doubling the power transmitting capacity of a flexible coupling of the disk type. Thus in Fig. 3, each of the studs 12 is provided with a more extended reduced end portion 13 upon which is slidably mounted a bushing 14 of sufficient length to accommodate the washer 15, two flexible disks 16 and a separator washer 17. According to Fig. 4, each of the studs 18 is provided with an elongated end portion 19 which slidably mounts a bushing 20 which carries washer 21, and separator washers 23 for properly spacing the flexible disks 22 of which in this instance there are three. It will be seen therefore that with the same main coupling members, it is possible to vary the power transmitting capacity of the coupling merely changing the number of flexible disks included, studs and pinions of the required lengths being available for this purpose. In the embodiments, shown in Figs. 1 to 4 inclusive, it will be understood that the flexible disks are permitted to move axially at their points of connection with the flanges 4 so that said disks are permitted to automatically assume a proper neutral plane of operation between the oppositely disposed coupling members.

Referring now to the embodiment shown in Figs. 5 and 6, the shafts 1 and 2 have connected thereto the coupling disks 4 which are substantially similar to those shown in the other embodiment. Studs 25 are threaded into said coupling disks to project alternately in opposite directions as in the former embodiments. Reciprocably mounted on the reduced end 26 of each of the studs 25, is a bearing segment or bushing 27 which is spherically journaled in paired bearing sockets 28 which are secured together and to a centrally disposed disk 29 by means of bolts 30. The ball and socket joints which are thus constituted, provide universal connections between the centrally disposed disk and each of the coupling disks 4, 4. By means of this construction, the centrally disposed disk 29 is free completely from any tendency to flexure which ordinarily arises in flexible couplings by reason of lack of coincidence between the shaft axes. It thus becomes possible to employ an intermediate disk 29 of steel or other substantially inflexible material as well as fabric and similar materials.

I claim:—

1. In a flexible coupling, driving and driven coupling members, pins or studs mounted on said coupling members and projecting axially of said coupling members, the pins or studs on one coupling member being arranged alternately with respect to the pins or studs on the other of said coupling members, a flexible disk arranged between said coupling members, and bushings slidable axially on said pins or studs, said bushings being secured to said disk.

2. In a flexible coupling, driving and driven coupling members, pins or studs carried by each of said coupling members, bushings slidable axially on said studs, and a disk disposed between said coupling members and having bearing sockets oscillatably embracing said bushings, said bushings being oscillatable within said sockets about axes transverse to the axes of said coupling members.

IRVEN H. DEXTER.